United States Patent [19]

Burgoon

[11] Patent Number: 4,918,517
[45] Date of Patent: Apr. 17, 1990

[54] SYSTEM AND PROCESS FOR VIDEO MONITORING A WELDING OPERATION

[75] Inventor: Charles E. Burgoon, Kenosha, Wis.

[73] Assignee: Westinghouse Electric Corp., Pittsburgh, Pa.

[21] Appl. No.: 301,713

[22] Filed: Jan. 26, 1989

[51] Int. Cl.⁴ ............................................. H04N 7/18
[52] U.S. Cl. ..................................... 358/101; 358/225; 358/901
[58] Field of Search .................. 358/101, 93, 100, 225, 358/901, 98

[56] References Cited

U.S. PATENT DOCUMENTS

| | | | |
|---|---|---|---|
| 4,039,254 | 8/1977 | Harsch | 350/330 |
| 4,240,709 | 12/1980 | Hornell | 350/335 |
| 4,251,141 | 2/1981 | Stemme et al. | 354/422 |
| 4,348,578 | 9/1982 | Masaki | 219/130.01 |
| 4,591,253 | 5/1986 | Hecker et al. | 354/227.1 |
| 4,639,772 | 1/1987 | Sluyter | 358/98 |
| 4,649,426 | 3/1987 | Bolstad | 358/101 |
| 4,728,173 | 3/1988 | Toth | 350/332 |
| 4,730,096 | 3/1988 | Mizumoto | 219/130.01 |

Primary Examiner—Howard W. Britton

[57] ABSTRACT

The invention is both a system and method for video monitoring a metal working process which involves the generation of an intense point source of light near or on a workpiece, such as an electric arc welding process. The system comprises a lens assembly for projecting an image of the point source of light and the area of the workpiece being worked onto the image sensing circuit of a television camera, a filter assembly having at least one filter element that includes both a central region of low light transmission for dimming the image of the point source of light projected onto the image sensing circuit, and a peripheral region of high light transmission for freely transmitting the image of the background surrounding the point source, and a mechanism for adjusting the apparent size of the central region of low light transmission relative to the image. In the preferred embodiment, an iris disposed within the lens assembly is used to adjust the apparent size of the central region so that it just barely covers the bright arc generated by the torch assembly so that the weld puddle and surrounding area of the workpiece is clearly visible and brightly illuminated in the resulting video image. The system provides a clear, bright and well balanced image of a welding operation without the severe and obscuring contrasts associated with prior art monitoring devices.

35 Claims, 6 Drawing Sheets

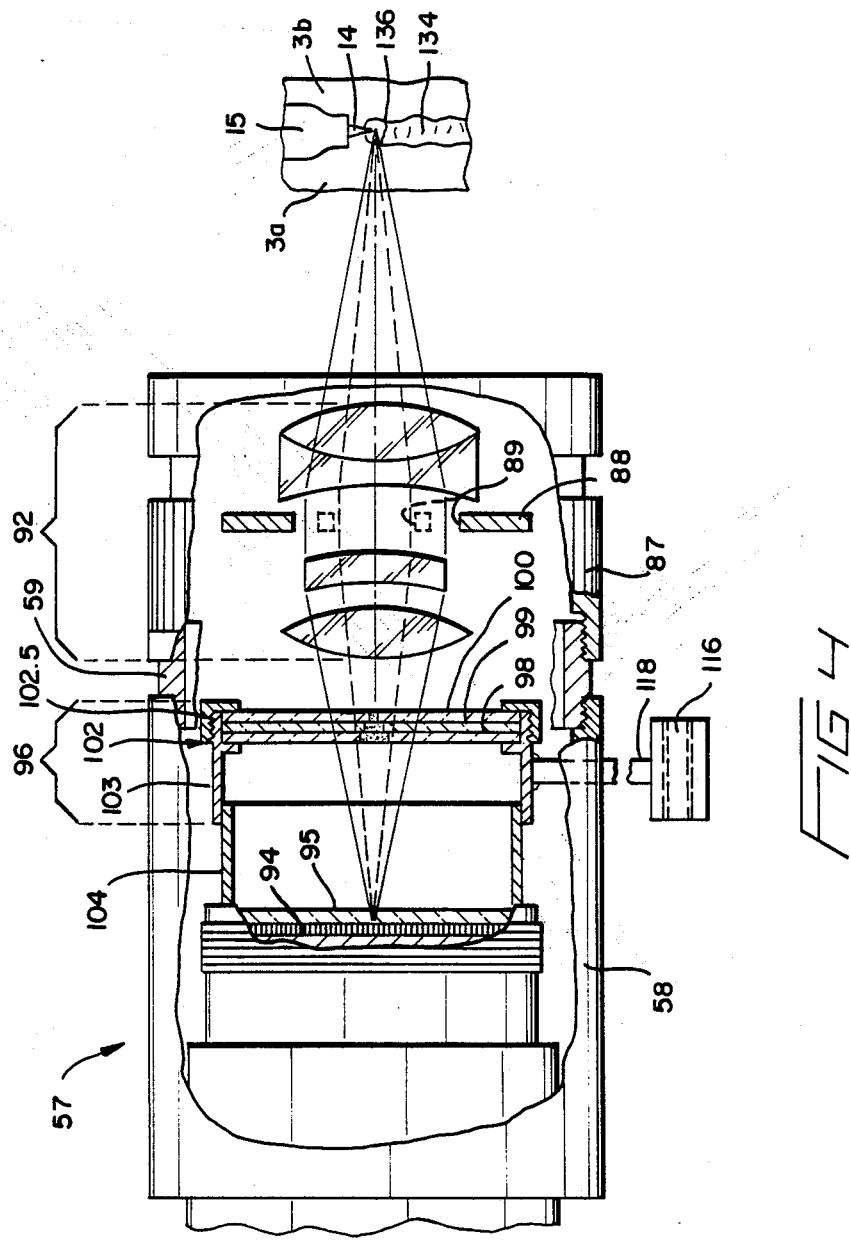

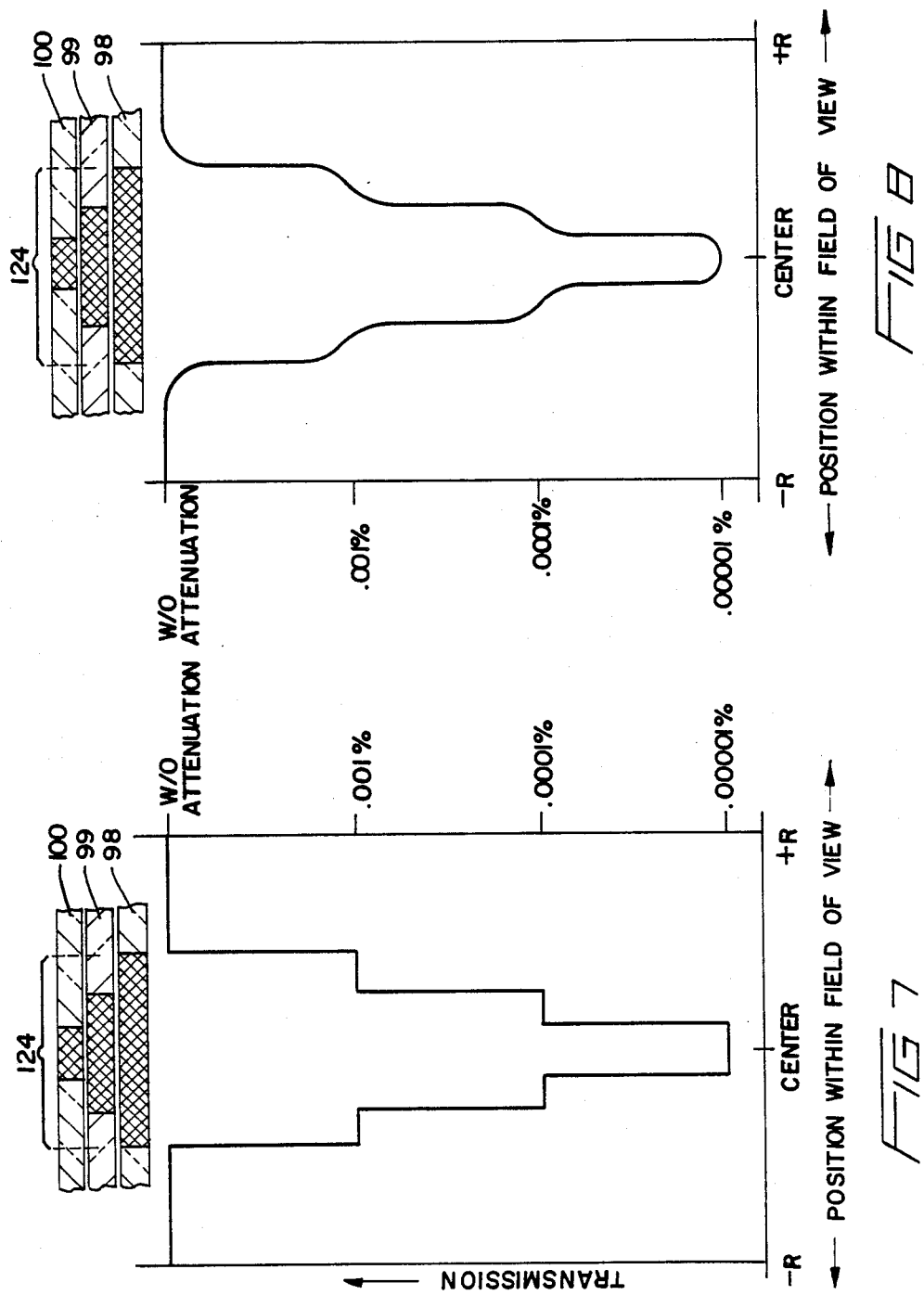

SYSTEM AND PROCESS FOR VIDEO MONITORING A WELDING OPERATION

BACKGROUND OF THE INVENTION

This invention relates to systems for monitoring processes where an intense point source of light is generated incident to a metal working process, and is specifically concerned with a video monitoring system and method for monitoring a gas and arc welding or cutting operation.

Systems for video monitoring an arc welding operation are known in the prior art. Such systems are often used in situations where it is impossible or impractical for a human operator to have direct, hands-on access to the workpiece such as when a weld must be produced in the inner diameter of a pipe, or within the radioactive environment of a nuclear steam generator. These video monitoring systems allow the welder to observe the position of the electrode and the filler wire relative to the workpiece, as well as the characteristics of the weld puddle created by the electric arc. This information helps the operator to remotely control the dynamics of the weld puddle so that the weld is produced uniformly and without flaws.

Unfortunately, the images produced by such video monitoring systems are generally not as clear and informative to a welder as the image he might see through a conventional welding hood. This difference in quality stems largely from the fact that the sensing circuit of a conventional television camera (which is a pixel array of a light-sensitive charge coupled device) does not have the interpretative abilities that the human eye does when used in combination with the brain. While the filter glass used in a conventional welding hood produces an image wherein the arc is essentially white and the background of the workpiece is very nearly black, the eye and brain are able to interpret this image so that the welder is able to see fairly clearly the position of the electrode of the torch relative to the workpiece, the resulting weld puddle, the contour of the weld, and the wettability of the leading edge of the puddle. However, in the case of a television camera, the bright image of the arc saturates a portion of the charge coupled device (CCD) of the light sensing circuit, yielding a television image that includes severe contrasts wherein the background surrounding the electric arc is darkened into obscurity. Additionally, the applicant has noted that some of the light filtration components in these systems are apt to create "ghost" images and stray refractions which further blur the resulting image. In an attempt to balance these severe contrasts, some prior art television systems have employed pulsed light sources such as xenon flash units or lasers synchronized with the actuation of the television camera, in combination with narrow bandwith filters which conduct only a very narrow range of light frequencies that are present in the spectrum of the arc light. Unfortunately, the use of such background lighting necessitates the positioning of still another component in the often limited access area around the weld, and significantly increases the cost of the operation of the monitoring system. Additionally, systems that use such narrow bandwidth filters are only capable of generating a black and white image, which gives the system operator less information than a color image, particularly when the system is used to inspect a completed weld.

In addition to the problem of obscuring contrasts, a second major problem associated with many prior art systems is the mechanical interference that the components of the video monitoring system impose upon the movement of the weld head. In some systems, the movement of the weld head is limited by a relatively large and bulky camera assembly which is connected directly on the weld head. The relatively large and bulky size of such camera assembly is due in part to the fact that such assemblies must contain not only the television camera, but a separate array of lenses, electronic light valves, iris diaphragms, neutral density filters or cross-polarizing filters all positioned in tandem which are used to dim the image of the arc before it strikes the light-sensitive array of charge coupled devices within the camera. In an attempt to solve the mechanical interference problems caused by the mounting of the camera assembly on the weld head, some other prior art systems use fiber optical cables to remotely transmit an optical image to a television camera. However, these fiber optical cables lose a great deal of the transmitted light which reduces the resulting resolution of the television image, and are easily browned and burned out by radiation which in turn necessitates frequent replacement.

Clearly, there is a need for a television monitoring system for observing a welding operation which produces a clear, sharp and contrast-balanced image where the portion of the workpiece surrounding the welding arc is easily visible without the need for auxiliary background lighting. Ideally, such a system should be compact enough in design so as to offer little or no mechanical interference to the weld head as it is manipulated during a welding operation. Moreover, the system should be comprised of a small number of simple and inexpensive parts that are capable of producing a clear and well lighted welding images under a variety of different conditions and for a variety of different welding systems. Finally, the system should be sensitive to a variety of different light frequencies so that the generation of a color image is possible, be easily installable onto a variety of existing tungsten-inert gas weld heads, and be completely safe to use under all conditions.

SUMMARY OF THE INVENTION

Generally speaking, the invention is an system for visually monitoring a process that involves the generation of an intense point source of light adjacent to a workpiece, such as an electric arc used to weld a piece of metal, that overcomes the disadvantages of the prior art. The system of the invention comprises a lens assembly for projecting an image of the point source of light and the area of the workpiece being worked onto an image sensing circuit, which is preferably the CCD pixel array of a television camera whose output is displayed on a television monitor, a filter assembly having at least one filter element that includes a central region of low light transmission for dimming the image of the point source of light that the lens assembly projects onto the sensing means and a peripheral region of high light transmission for freely transmitting the image of the area where the workpiece is being worked, and a means for adjusting the apparent size of the central region of low light transmission relative to the image. In the preferred embodiment, the adjustment means may be with a mechanical or an electronic iris disposed in front of or within the lens assembly. In the alternative, the adjustment means may be a telescopic mounting that allows the filter assembly to be moved either toward or away from the CCD array of the television camera. In either case, the filter assembly is preferably located within the television camera along the optical axis of the lens assembly at a point outside of the image and objective focal plane so that the resulting image of the region of low light transmission appears softened around its edges, thereby avoiding potentially harsh and distracting filter transitions in the resulting video image.

Each of the filter elements of the filter assembly may be formed from a section of developed photographic film whose central region includes a circle of photographic emulsion and whose peripheral region is formed from clear film free of any photographic emulsion. For this purpose, the applicant has found that KODAK Tri-X Pan film works unusually well due to the high light transmissivity of a developed portion of this film that is free from photographic emulsion. In the preferred embodiment of the filter assembly, three filter elements are stacked together such that their circularly shaped central regions of low light transmission concentrically overlap one another. As at least some of these regions are of different diameters, the aggregate central region of the filter assembly yields a pattern of concentric rings which become progressively darker closer to the center of the region. In the preferred embodiment, the filter assembly, lens assembly and iris are all contained within the body of a commercially available miniature television camera.

The system further comprises a means for uniformly attenuating the brightness of the image projected onto the charged coupled device array, which is preferably in the form of a high speed electronic shutter that is included within the image processing circuitry connected between the television camera and the television monitor. When this shutter is operated at a speed of 1/1000 of a second, approximately 94 percent of the light forming each part of the aggregate image is attenuated. In the alternative, neutral density filters, electronic light valves, or an additional iris diaphragm may be used to attenuate the light of the image, either singly or in combination. However, the use of an electronic shutter for this purpose provides the most compact camera and housing arrangement as it obviates the need for the addition of other optical components to the lens assembly.

The housing of the system is a water cooled housing that contains and protects the television camera, which in turn contains the lens assembly, the filter assembly, the light-sensitive CCD array and the iris used for adjusting the apparent size of the central region of the filter assembly. This housing is preferably water cooled, and is advantageously connected to the water cooling circuit that is normally present in a standard arc welding and cutting torch to cool the torch block thereof during a welding operation. Finally, the system includes a current pulsing circuit for use in connection with the electrical power supply that is connected to the torch electrode so that the brightness of the electric arc may be cyclically minimized, as well as a gating circuit for conducting the video signal from the television camera to the television monitor only when the arc brightness is at a minimum.

In operation, the water-cooled housing containing the television camera is oriented relative to the torch assembly by means of an adjustable bracket so that the aggregate central region of the filter assembly is superimposed over the image of the electric arc. The operator of the system then adjusts the relative size of the central region of low light transmissivity so that it just covers the bright electric arc. The ability of the system to precisely control the size of the central region of low light transmission in the television image allows the weld puddle and the surrounding area of the workpiece to be clearly seen without heavy, uniform light filtration and hence without the severe contrasts produced by prior art welding monitoring systems. To further enhance the quality of the resulting image, the power to the weld head may be cyclically pulsed by the current pulsing circuit so that the brightness of the resulting arc periodically falls to a minimum value, and the gating circuit may be adjusted to conduct the video signal from the camera to the television monitor only during these periods of minimum arc brightness.

BRIEF DESCRIPTION OF THE SEVERAL FIGURES

FIG. 4 is a cross-sectional side view of the camera disposed within the camera assembly illustrated in FIG. 3;

Figure 9:
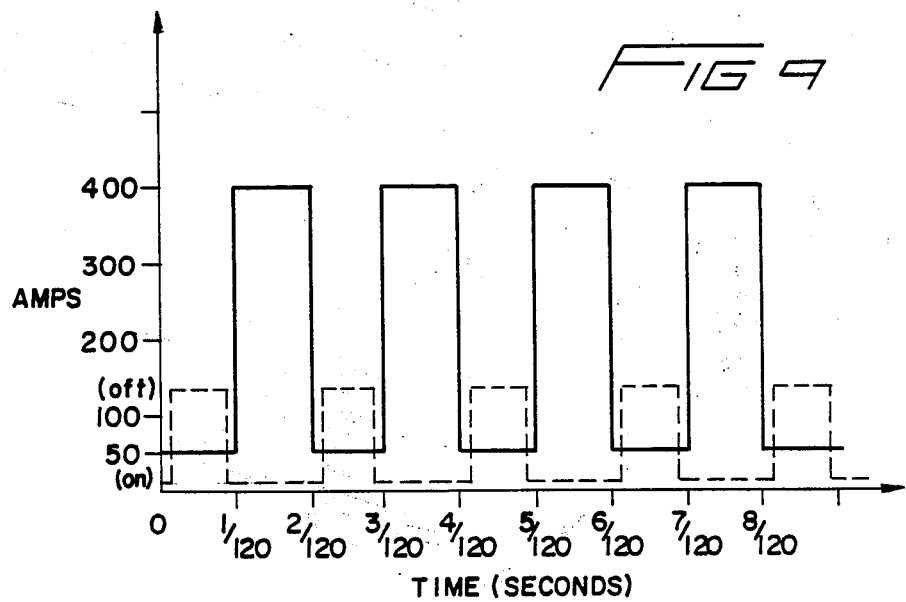

FIGS. 7 and 8 are graphs illustrating how the transmissivity of the aggregate centralized region of the stack of filter elements decreases toward the center, and how the transition zones between the concentric areas of low light transmissivity may be softened by positioning the filter assembly out of the focal planes of the lens assembly of the television camera; and FIG. 9 is a graph illustrating how the amount of current delivered to the electrode of the torch may be cyclically lowered to a relatively low amperage, and how the gating circuit of the system may be adjusted to conduct the video signal only during the troughs in the square wave current output curve.

DETAILED DESCRIPTION OF THE PREFERRED EMBODIMENT

The system 1 for video monitoring a welding operation on a workpiece 2 which may be a pair of pipe sections 3a,3b being welded together generally comprises a television monitoring system 4, a pair of television camera assemblies 5a,5b mounted on either side of the workpiece 3, an image processing circuit 7 which may be any one of the number of conventional video processing circuits, and television monitors 8a,8b for displaying the images received by the camera assemblies 5a,5b. In the preferred embodiment, both of the cameras within the camera assemblies 5a and 5b and the image processing circuit 7 are all parts of a Model No. EM-102 video monitoring system manufactured by Elmo, Incorporated located in New Hyde Park, N.Y. In the alternative, a Toshiba Model No. M-10B video monitoring system may be used. The system 1 also includes a gating circuit 9 for cyclically interrupting the transmission of the video signal from the image processing circuit 7 to the video monitors 8a,8b, the frequency of the cycle of interruption being adjustable. Finally, a current pulser 11 is included within the system 1 for cyclically varying the current conducted to the weld head used in conjunction with the system 1. In the preferred embodiment, current pulser 11 in a "Pulse Plus" model current pulser manufactured by M-K Products located in Irvine, Calif. Such a pulser is capable of cyclically varying the current conducted to a weld head in a square-wave pattern anywhere between 5 and 400 amps at a periodic frequency of anywhere between 40 and 600 cycles per second. As will be discussed in more detail hereinafter, the operational frequencies of the gating circuit 9 and the current pulser 11 may be coordinated so that the television monitors 8a and 8b display an image only when the current supplied to the torch electrode is at a minimum and the electric arc is at its dimmest.

The welding system 12 that the video monitoring system 1 is preferably used in conjunction with includes a torch assembly and wire manipulator 13 having a tungsten electrode 14 that is surrounded by a gas-conducting ceramic sleeve 15. The tungsten electrode 14 of the torch assembly 13 is electrically connected to a power supply 16, and mechanically connected to a robotic arm 17 that remotely guides and manipulates the weld head 13. The torch assembly 13 is further connected to a bottle of pressurized, inert gas 18 such as argon through the power supply 16. Specifically, the power supply 16 includes a fitting 20 for receiving an inlet hose 22 connected to the bottle 18 of pressurized gas, as well as an outlet hose 24 that is in turn connected to a fitting 26 centrally located within the torch assembly 13. The power supply 16 is connected to the current pulser 11 by way of a power cable 28, and the pulser 11 is in turn connected to the torch assembly 13 by means of another power cable 30 by way of an electrical and mechanical connector 32. The power supply 16 has water circulation inlet and outlet hoses 35a and 35b. These hoses are respectively connected to the inlet and outlet hoses 37a,37b of the torch assembly 13, as well as the inlet and outlet hoses 39a,39b, and 41a,41b connected to both of the camera assemblies 5a and 5b in order to maintain the camera assemblies and the torch assembly 13 cool during a welding operation. In the preferred embodiment, the power supply 16 is a Gold Track II type power supply manufactured by Dimetrics located in Diamond Springs, Calif. Of course, any one of a number of other conventional welding power supply 16 may be used in conjunction with the system 1 of the invention. A wire feeder 42 is further included with the torch assembly 13 in order to provide a uniform supply of fusible metal during a welding operation which may be used to fill the weld joint or to build up weld overlays.

Figure 1:
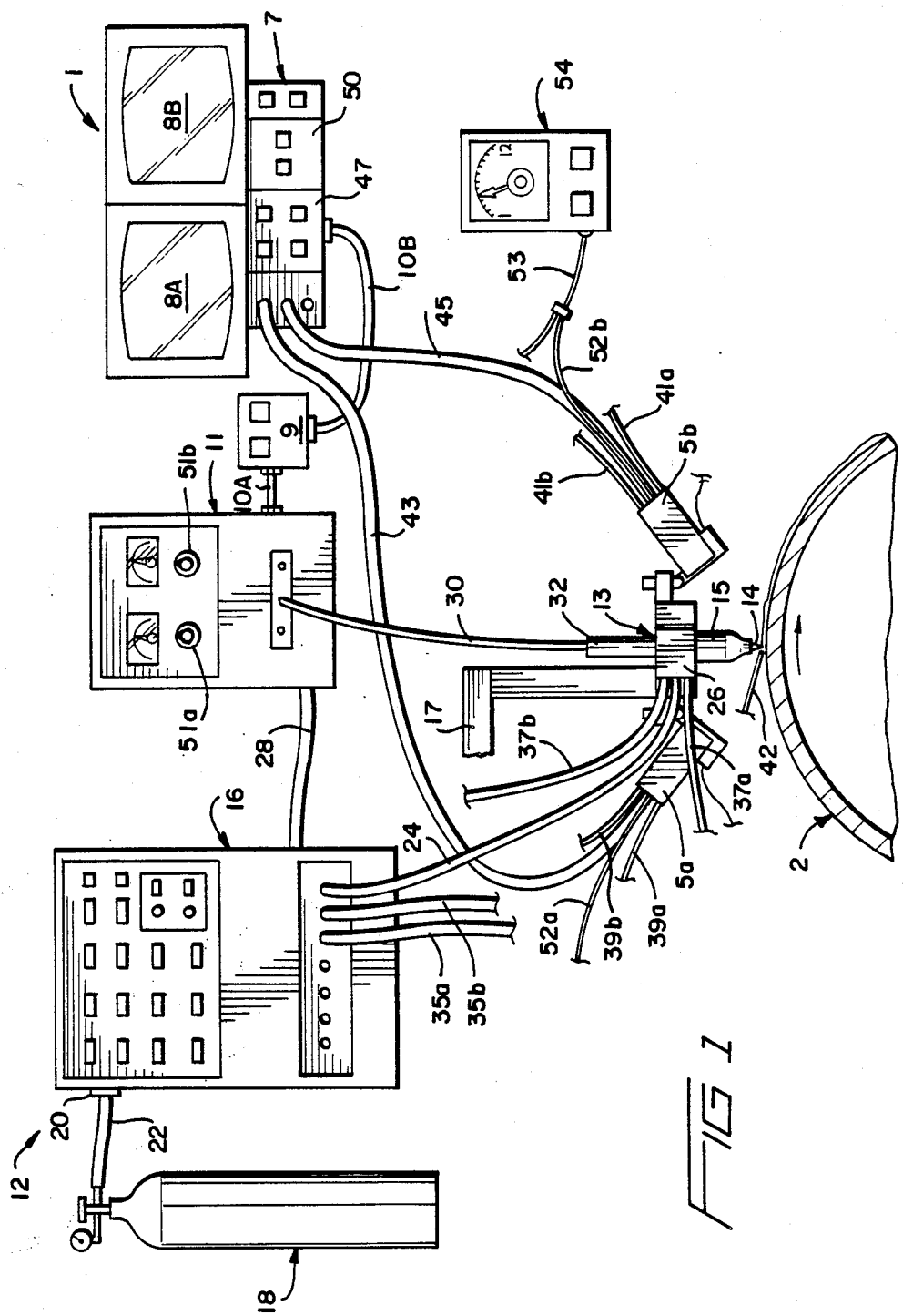
FIG. 1 is a schematic diagram of the video monitoring system of the invention as applied to a conventional arc welding system.
Figure 2:
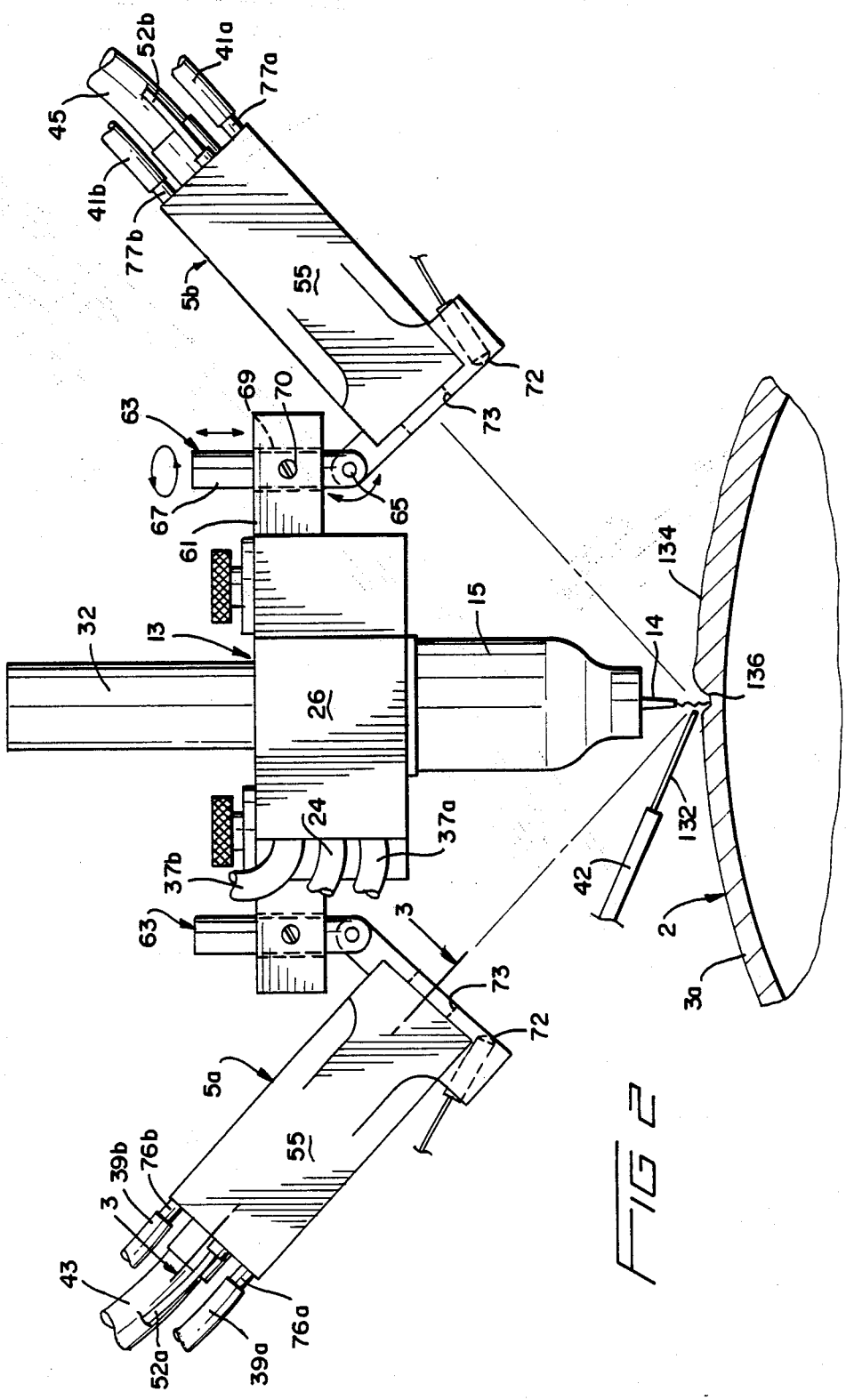
FIG. 2 is a side view of the television camera assemblies of the video monitoring system mounted onto a gas tungsten arc welding torch and wire manipulator.

With reference now to FIGS. 1 and 2, coaxial cables 43 and 45 connect each of the camera assemblies 5a and 5b to the image processing circuitry 7 of the video monitoring system 4. The image processing circuit 7 of the Elmo video system electronically shutters the image it receives from the CCDs of the camera assemblies 5a,5b, and circuit 7 has an electronic shutter control 47 for selecting the speed of this electronic shutter. In the Elmo Model No. 102 camera system, the electronic shutter control 47 allows the operator to choose between a shutter speed of 1/60th of a second, or 1/1000th of a second. During a welding or cutting operation, a shutter speed of 1/1000th of a second is preferred since such a shutter speed results in a 95 percent uniform attenuation of the intensity of the video image signal generated by the CCD array within the camera assemblies 5a and 5b. Hence, the practical effect of such a relatively fast shutter speed is that of a neutral density filter which uniformly blocks approximately 95 percent of the light striking the CCD array within the television assemblies 5a and 5b without any of the stray light refractions or detail-diminishing side effects that optical filters can impose upon the camera optical system. The image processing circuitry 7 also includes a gain control 50 which the operator may use to adjust the overall brightness of the image displayed on the television monitors 8a and 8b. Turning now to the current pulser 11, this device has controls 51a and 51b for adjusting both the maximum and minimum amperages of the current entering the torch assembly 13, as well as the frequency of the current fluctuations. In the preferred mode of operation, the frequency control 51b is set so that the current pulses from a relatively high amperage to a relatively low amperage once every 160th of a second. Finally, motor power cables 52a and 52b extend out of the back portions of each of the camera assemblies 5a and 5b as shown. Each of these motor cables 52a and 52b are ultimately connected to the output cable 53 of a motor power source 54 which generates either a positive or a negative DC current having a voltage of anywhere between 1 and 12 volts. As will be seen presently, the motor power cables 52a,52b are connected to iris drive motors which selectively open or close a mechanical iris disposed within each of the camera assemblies 5a,5b.

Figure 3:
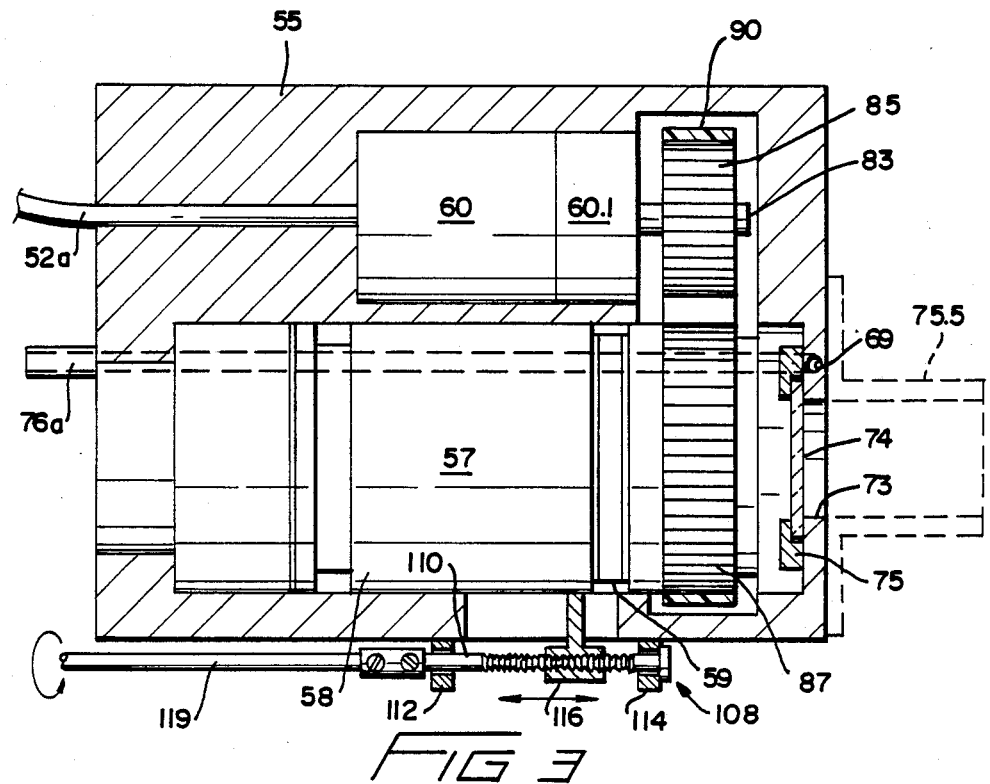
FIG. 3 is a cross-sectional plan view of one of the camera assemblies illustrated in FIG. 2 along the line 3—3.

With reference now to FIGS. 2 and 3, each of the television camera assemblies 5a and 5b is provided with a housing 55 preferably formed from aluminum or some other heat conductive material. The housing 55 of each camera assembly 5a,5b contains a television camera 57 having a cylindrical body 58 that is formed in two parts which are threadedly interconnected by means of a body coupler and extender 59. In instances where the television camera 57 is used to directly view a welding operation, the body coupler and extender 59 will merely serve to couple the cylinderical body 58 together as is shown in FIG. 3. However, in instances where the television camera is used to view a welding operation indirectly through a bundle of optical fibers, the body coupler and extender 59 will be made approximately ½ inches long so as to lengthen the cylindrical body 58 of the television camera 57 by that distance in order to expand the image received by the fiber optic bundle to fill up the field of view of the camera. Further contained within the housing 55 is an iris drive motor 60 that is connected to the previously mentioned 12 volt motor power source 54 by means of motor power cables 52a and 52b. In the preferred embodiment, the iris drive motor is a Model 10-16 reversible DC motor manufactured by MicroMo located in St. Petersburg, Fla., having a gear train reducer that converts 256 input turns to one output turn.

The housing 55 of each of the camera assemblies 5a and 5b is connected to a flange 61 that overhangs both sides of the torch assembly 13 by means of a bracket 63. Each bracket 63 is provided with a pivoting joint 65 that allows the front face of the housing 55 to be oriented so that it faces the tungsten electrode 14 of the torch assembly 13. The bracket 63 further includes a leg 67 connected to the pivoting joint 65 that extends through a bore 69 in one end of the flange 61. Leg 67 is rotatably movable within the bore 69 so as to impart a panning movement to the camera assemblies 5a and 5b. Additionally, the leg 67 may be extended or retracted through the bore 69, therefore imparting some degree of height adjustment to the camera assemblies 5a and 5b. A set screw 71 allows the leg 67 to be secured into a desired orientation with respect to the bore 69.

At the front end of the housing 55, a pair of miniature, high intensity lamps 72 are mounted for providing a flood-type illumination of the area of the workpiece being welded in the preferred embodiment. Each of the high intensity lamps 72 is a Model L-1021 type incandescence bulb available from the Bulles-Gillway Corporation located in Wobourn, Mass. Such bulbs require a DC current of 3.5 volts, and are capable of generating 1200 luxs. The front end of the housing 55 also includes a circular opening 73 for admitting light from the area of the workpiece being welded to the television camera 57. A protective window 74 is mounted just inside the circular opening 73 by means of retaining clips 75. This window 74 is preferably formed from heat resistant, Pyrex glass, and serves to protect the objective lens of the lens assembly of the television camera 57 from the heat, fumes, and splattering metal created by the welding operation. A fiber optical connector 75.5 (indicated in phantom) may optionally be mounted over the front end of the housing 55. This connector 75.5 is generally tubular in shape, and terminates in a flange which may be conveniently secured onto the front face of the housing 55 by mounting screws. When the camera 57 is used in conjunction with a fiber-optic bundle, the protective window 74 is removed and the end of the fiber-optic bundle (not shown) is placed so that it is approximately 1/16th inch (1.5875 millimeters) from the front surface of the objective lens of the camera 57. Additionally, the short body coupler and extender 59 shown in FIG. 3 is replaced with one which is longer with respect to the longitudinal axis of the camera 57 so that the lens assembly of the camera 57 is positioned approximately ½ inch further away from the CCD. Such longitudinal displacement of the lens assembly from the CCD allows the image projected by the fiber optic bundle to completely fill the field of view of the CCD. At their back ends, each of the housings 55 of the camera assemblies 5a and 5b includes a pair of pipette nipples 76a, 76b; 77a and 77b, respectively. These nipples each communicate with a bore 79 that circumscribes the housing 55. In operation, water is circulated through the bore 79 from the nipples 76a, 76b, 77a and 77b in each of the cameras 5a and 5b. Finally, the housing 55 of each of the camera assemblies 5a and 5b includes a cable connector 81 for connecting the output of the CCD pixel array of each of the cameras 57 to the image processing circuitry 7.

Turning now to the interior of the housing 55, the iris drive motor 60 includes an output shaft (not shown) which is in turn linked to a gear train 60.1 as shown which reduces the rotary output of the motor 60 by a ratio of 256 to 1. This gear train 60.1 terminates in a drive shaft 83 which is in turn connected to a drive wheel 85. Drive wheel 85 is turn linked to a rotatable iris control 87 which serves to open or close a mechanical iris 88 disposed within the lens assembly 92 of the camera 57. Linkage is achieved between the drive wheel 85 and the rotatable iris control 85 by means of a flexible belt 90. The belt 90 engages the drive wheel 85 and the rotatable iris control 87 tightly enough to effectively transfer a rotary motion from the wheel 85 to the control 87, but yet loosely enough to allow slippage to occur between these components when the iris 88 has been dilated or contracted to its maximum extent. The use of such a loose-fitting, flexible belt 90 in lieu of spur gears or some other type of drive linkage prevents an overload condition from occurring within the motor 60 if the power is left on after the iris has been dilated or contracted to its maximum extent.

With specific reference to FIG. 4, the television camera 57 includes the previously mentioned lens assembly 92. In the preferred embodiment, a lens assembly 92 with a 7.5 millimeter focal length is used, which allows the front end of the camera assemblies 7a,7b to be placed approximately 1.5 inches (3.81 centimeters) away from the electric arc generated by the tungsten electrode 14. Such close positioning between the camera assemblies 5a and 5b and the tungsten electrode 14 advantageously gives the torch assembly 13 a fairly compact configuration which allows it to be manipulated in relatively small spaces with a minimum amount of mechanical interference. Of course, cameras with longer focal lengths (such as 15 millimeters) can be used when a compact weld head configuration is not necessary. The increase in the distance between the camera assemblies and the end of the tungsten electrode 14 from 1.5 to 3 inches (7.6 centimeters) has the advantage of reducing the heat load upon the housing 55. Disposed behind the lens assembly 92 is an image sensing circuit 94 which is preferably, as has been indicated earlier, a CCD pixel array. Disposed over the image sensing circuit 94 in an RGB filter for balancing the color sensitivity of the circuit 94 so that it "sees" colors in the same porportions as the human eye, which is most sensitive to green light and least sensitive to blue light.

Figure 5:
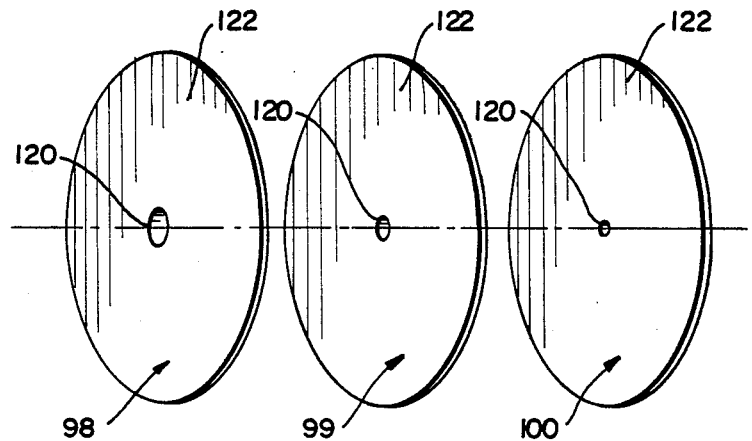
FIG. 5 is an exploded view of the filter elements of the filter assembly within the television camera of the system, illustrating how the centralized areas of low light transmission are each concentrically arranged with respect to the optical axis of the television camera.

With reference now to FIGS. 4 and 5, a regionalized filter assembly 96 is disposed between the lens assembly 92 and the image sensing circuit 94. This filter assembly 96 is preferably formed from a stack of filter elements 98, 99 and 100 which are mounted in overlapping and concentric relationship with one another by means of filter retainer assembly 102. Filter retainer assembly 102 is formed from a retainer ring 102.5 at its distal end, and a telescopic barrel 103 at is proximal end. This telescopic barrel 103 receives circular sleeve 104 and is slidably movable along the optical axis of the camera 57.

The television camera 57 further includes a cable drive assembly 108 for sliding the filter assembly 96 either closer or further away from the image sensing circuit 94 in order to change the apparent size of the centrally located darkened region of the filter elements 98, 99 and 100 with respect to the image projected onto the image sensing circuit 94 by the lens assembly 92. To this end, the cable drive assembly 108 is provided with a lead screw 110 whose ends are rotatably mounted within a pair of screw mounts 112 and 114. A riding nut 116 is threadedly engaged to the lead screw 110 such that it moves along the longitudinal axis of the lead screw 110 when lead screw 110 is rotated. A bracket 118 interconnects the riding nut 116 with the telescopic barrel 103 through a slot in the cylindrical body 58 of the television camera 57. A drive cable 119 is coupled onto the proximal end of the lead screw 110. In operation, the drive cable 119 may be connected to either a reversible DC electric motor, or may be turned by hand in order to move the stacked array of filter elements 98, 99 and 100 a desired distance with respect to the image sensing circuit 94.

Figure 6:
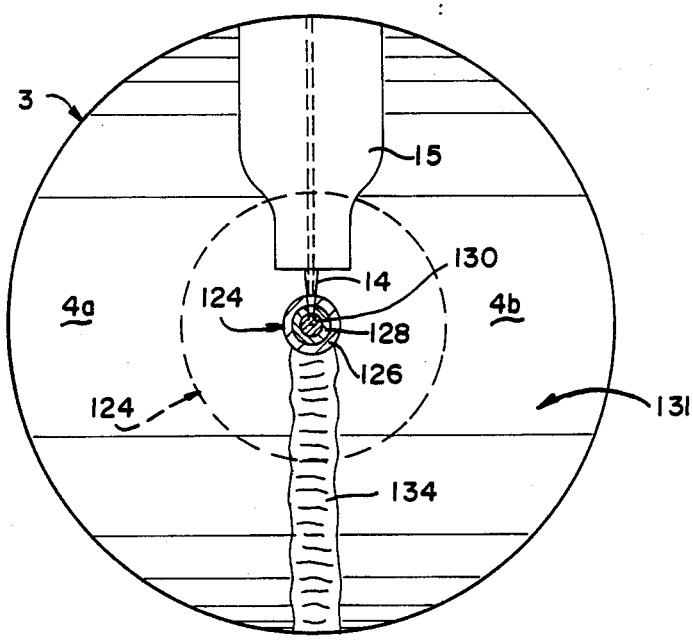
FIG. 6 illustrates how the aggregate central area of low light transmission of the filter elements is superimposed over the image of the bright arc emitted by the weld electrode in order to balance the amounts of light received from the arc and the portion of the workpiece surrounding the arc.

With reference to FIGS. 5 and 6, each of the filter elements 98, 99 and 100 of the filter assembly 96 includes a central region 120 of low light transmission that is surrounded by a peripheral region 122 of high light transmission. In the preferred embodiment, peripheral region 122 is as close to transparent as possible, while the central region 120 should transmit only about 1/1000th of the light that impinges upon it. Moreover, the filter medium that forms the filter elements 98, 99 and 100 should be easy to work with, and not apt to cause stray refractions that could mar the image projected on to the image sensing circuit 94 by the lens assembly 92. The applicant has surprisingly found that exposed and developed Tri-X-Pan manufactured by KODAK Corporation located in Rochester, N.Y., works extremely well for this purpose. It is a relatively simple matter to photograph a series of white dots of varying diameters placed within a black background to create a negative having a series of black dots of different diameters surrounded by a transparent background. Each small black dot on the negative is precisely centered within a hole punching machine to create a circular filter element as shown in FIG. 5. In the preferred embodiment, the central region 120 of filter element 98 is 1/16th inches (1.5875 millimeters) in diameter, while the central regions 120 of filter elements 99 and 100 are approximately 1/24th (1.0583316 millimeters) and 1/32nd (0.79375 millimeters) of an inch in diameter apiece, respectively.

With reference now to FIGS. 6, 7 and 8, when the filter elements 98, 99 and 100 are stacked over one another with their central regions 120 concentrically arranged, an aggregate region 124 of low light transmission is formed which is visible at the center portion of the resulting image. This aggregate region 124 includes an outer zone 126, a middle zone 128 and a center zone 130 of constantly increasing light filtration. Specifically, the outer zone 126 transmits approximately 1/1000th of the light which impinges upon it, while the middle and center zones 128 and 130 transmit approximately 1/10,000th and 1/100,000th percent of this light respectively. Due to the high transmissivity of the peripheral region 122 of each of the filter elements 98, 99 and, the aggregate peripheral region 131 transmits essentially all of the light that impinges upon it. The filter elements 98, 99 and 100 should be kept out of the focal plane of the lens assembly 92. A comparison of how the transitions appear between the zones 126, 128 and 130 when the filter elements are within and without the focal plane of the lens assembly 92 may be made by comparing these transitions in FIGS. 7 and 8. When the filter elements 98, 99 and 100 are positioned within the focal plane, the concentric zones 126, 128 and 130 project a "bullseye target" type image over the arc and weld puddle which is optically distracting. However, when these filter elements are positioned outside of the focal plane, the harsh edges of the transition are softened as though they were vignetted.

In operation, the television camera assemblies 5a and 5b are switched on, and the bracket 63 of each of these assemblies is adjusted so that the aggregate region 124 of low light transmission covers the region surrounding the tip end of the electrode 14 of the torch assembly 13. The apparent size of the aggregate region 124 of low light transmission may be varied between the limits indicated in FIG. 6 in either one of two ways. First, the mechanical iris 88 may be opened or closed by actuation of the iris drive motor 60. As the iris 88 is closed, the column of light passing through the lens assembly 92 is narrowed (as is indicated by the dotted lines) which in turn causes the lens assembly 92 to focus more light through the aggregate region 124, thereby making this region appear larger in the resulting image. Alternatively, the drive cable 119 of the cable drive assembly 108 may be manually or remotely turned, thereby moving the filter assembly 96 closer to or farther away from the image sensing circuit 94. The apparent size of the aggregate region 124 of low light transmission will appear larger as the filter assembly 96 is moved closer toward the image sensing circuit 94.

Next, the operator strikes an arc with the electrode 14 of the torch assembly 13. At this juncture, the operator makes a final adjustment with respect to the apparent size of the aggregate region 124 so that the darkest central zone 130 just covers the bright arc. The welding operation is then commenced with the wire feeder 34 feeding in metal wire 132 of an appropriate composition to form a weld bead 134 on the workpiece 2. The system 1 allows the operator to easily see the weld puddle 136 created by the arc, and the wettability of the leading edge of the liquid metal formed by the arc. Additionally, both the position of the electrode 13 relative to the workpiece 3 may be observed, as well as its condition. The use of a color television camera 57 advantageously allows the welding operator to observe the relative color of the completed weld bead 134 on the workpiece 3 and to better evaluate the quality of this bead 134 than would be possible if only a black and white television camera were used.

To better enhance the quality of this video image displayed over the television monitors 8a and 8b, the current pulser 11 may be used to supply pulsed power to the torch assembly 13 as is illustrated in the graph of FIG. 9, and the transmission of the video signal from the image processing circuitry 7 of the television monitors 8a,8b maybe synchronously interrupted with the high points in the current curve by means of the gating circuit 9 so that the monitors only generate an image on their screens when the current is at a low point. In the instant example, the system operator adjusts the current output of the power supply 16 to 400 amps. Next, the current limit control 51a of the current pulser 11 is adjusted so that the output of this device fluctuates between 50 amps and 400 amps in a square wave pattern. Next, the frequency control 51b of the current pulser 11 is adjusted so that the frequency of the square wave illustrated in FIG. 9 is 1/60th of a second. The control signal generated by the frequency control 51b is connected to the input of the gating circuit 9. Appropriate digital circuitry is provided within the gating circuit 9 so that the output of this device is a square wave signal which serves to interrupt the video signal transmitted from the imaging processing circuitry 7 to the television monitors 8a,8b whenever the current is at a level of 400 amps which in turn causes the imaging processing circuitry 7 to be at an "on" state only when the current level is at 50 amps. As the resulting electric arc is much dimmer at 50 amps than at 400 amps, the quality of the resulting image on the television monitors 8a and 8b is improved.

While the preferred embodiment of the system 1 shows the filter assembly 96 behind the lens assembly 92, it may alternatively be placed in front of the lens assembly 92, preferably out of the objective focal plane to soften the transitions between the filtered regions.

I claim:

1. A system for visually monitoring a process wherein an intense point source of light is generated in an area on a workpiece that is being worked, comprising:
   a lens assembly for projecting an image of the point source and the area of the workpiece being worked onto a sensing means;
   a filter assembly having at least one filter element that includes a central region of low light transmission for dimming the image of the point source projected onto the sensing means, and a peripheral region of high light transmission for freely transmitting the image of the area where the workpiece is being worked, and
   means for adjusting the apparent size of the central region of low light transmission relative to the image.

2. A system as defined in claim 1, wherein said size adjustment means includes an iris means.

3. A system as defined in claim 1, wherein said filter assembly is disposed at some point between said lens assembly and said sensing means.

4. A system as defined in claim 1, wherein said adjustment means includes a means for moving said filter assembly along the optical axis of said lens assembly.

5. A system as defined in claim 1, wherein said filter element is formed from a section of, photographic film whose central region includes an exposed region of said film and whose peripheral region includes a completely unexposed region of said film.

6. A system as defined in claim 1, wherein said sensing means includes a charge coupled device array of a television camera.

7. A system as defined in claim 1, further including a water-cooled housing for containing the lens assembly, the filter assembly and the central region adjustment means and protecting them from heat emitted by said intense point source.

8. A system as defined in claim 1, further comprising a light attenuator means for uniformly dimming all points of said image.

9. A system as defined in claim 8, wherein said sensing means includes the charge coupled device array of a television camera, and the light attenuator means includes an electronic shutter means operatively associated with said television camera.

10. A system for remotely visually monitoring a metal working process wherein an intense point source of light is generated in an area on a workpiece that is being worked, comprising:
    a lens assembly for projecting an image of the point source and the area of the workpiece being worked onto a sensing means;
    a filter assembly having at least one filter element that includes a central region of low light transmission for dimming the image of the point source projected onto the sensing means, and a peripheral region of high light transmission for freely transmitting the image of the area where the workpiece is being worked, and
    iris means for adjusting both the apparent size of the central region of low light transmission relative to the image, and for adjusting the brightness of the image.

11. A system as defined in claim 10, wherein the iris means is disposed on the side of the lens assembly opposite from the sensing means.

12. A system defined in claim 10, wherein said filter element is positioned out of the focal plane of the lens assembly to soften the edge of the central region of low light transmission on the image.

13. A system defined in claim 11, wherein the filter element is disposed between the lens assembly and the sensing means.

14. A system as defined in claim 10, wherein the filter assembly includes a plurality of stacked filter elements, each of which includes a central region of low light transmission, a peripheral region of high light transmission, wherein the central and peripheral regions of different filter elements mutually overlap.

15. A system as defined in claim 14, wherein the sizes of at least some of the central regions of different filter elements are different so that the overlapping central regions form a single, central region in the image that is more light transmissive at its edges than at its center.

16. A system as defined in claim 15, wherein each filter element is formed from a section of photographic film whose central region includes layer of photographic emulsion and whose peripheral region is devoid of such emulsion.

17. A system as defined in claim 10, further comprising a light attenuation means for uniformly dimming said image over its entire area.

18. A system as defined in claim 17, wherein said sensing means is a charge coupled device array of a television camera, and said light attenuation means is an electronic shutter means operatively associated with said camera.

19. A system as defined in claim 18, wherein said intense point of light is generated by an electric current, and further comprising first circuit means for cyclically lowering the electric current so that the intensity of the point source of light is lowered, and second circuit means for synchronizing the transmission of the signal from said camera with the times that said point light intensity is lowered.

20. A system for remotely visually monitoring an electric arc metal welding process wherein an intensely bright arc is generated adjacent to an area on a workpiece, comprising:
    a lens assembly for projecting an image of the arc and the area of the workpiece adjacent to said arc onto a charge coupled device array of a television camera that is connected to a television monitor;
    a filter assembly having a plurality of overlapping filter elements, each of which includes a central region of low light transmission for dimming the image of the arc projected onto the charge coupled device array, and a peripheral region of high light transmission for freely transmitting the image of the area adjacent to the arc, the central regions of different filters overlapping and being of different sizes so that the aggregate central region of the filter assembly transmits the least light in its center and progressively more light toward its edges;
    an iris means optically coupled to the lens assembly for adjusting the apparent size of the aggregate central region of the filter assembly, and wherein said television camera includes an electronic shutter for attenuating the brightness of the image that strikes the charge coupled device array.

21. A system as defined in claim 20, wherein said television camera is a color television camera.

22. A system as defined in claim 20, wherein the filter assembly is movable with respect to said lens assembly along the optical axis thereof so that the apparent size of the central regions of the filter elements in the image projected onto the charge coupled device can be adjusted.

23. A system as defined in claim 20, wherein the filter elements are out of the focal plane of the lens assembly in order to soften the edges of the images of the low light transmitting central regions of the filter elements within the image of the arc and workpiece projected onto the charge coupled device array.

24. A system as defined in claim 23, wherein the filter assembly is disposed between the lens assembly and the charge coupled device array.

25. A system as defined in claim 20, further comprising a housing including a cooling means for enclosing said lens and filter assemblies and said iris means and for protecting them from heat generated by said arc.

26. A system as defined in claim 28, wherein said cooling means includes a water circulation means connected to a source of pressurized water.

27. A system as defined in claim 20 wherein said electric arc is generated by a power supply, and further comprising a first circuit means for periodically varying the amount of current transmitted from said power supply to said arc and thereby varying the brightness of said arc between a high point and a low point, and a second circuit means for electrically connecting the television camera to the television monitor only when the brightness of said arc is at a low point.

28. A system as defined in claim 27, wherein the first circuit means reduces the current that generates the arc at a frequency between about 10 and 100 cycles per second, and said second circuit connects the television camera to the television monitor between 10 and 100 times per second during the times of current reduction.

29. A system as defined in claim 25, wherein the first circuit means reduces the current that generates the arc between about 40 and 80 times per second, and said second circuit connects the television camera to the television monitor between 15 and 30 times per second during the times of current reduction.

30. A method for remotely visually monitoring an electric arc welding process implemented by a weld head 13 by means of a television camera connected to a television monitor having a lens assembly for projecting an image on a visual sensing means, an iris means, and a filter assembly movable with respect to the focal plane of the lens assembly including at least one filter element provided with a centralized region of low light transmissivity surrounded by a peripheral region of high light transmissivity, comprising the steps of:

mounting the television camera onto the weld head in a position wherein an image of the electric arc is centrally disposed in the over-all image projected by the lens assembly, and adjusting the apparent size of the low light transmitting region of the filter element on the over-all image projected by the lens assembly until it barely covers the image of the electric arc.

31. A method as defined in claim 30, wherein the apparent size of the low light transmitting region of the filter element is adjusted by opening and closing said iris means.

32. A method as defined in claim 30 wherein the apparent size of the low light transmitting region of the filter element is adjusted by moving said filter assembly toward and away from said focal plane.

33. A method as defined in claim 30, wherein said television camera includes a shutter means, and further comprising the step of adjusting the speed of said shutter means to adjust the brightness of the over-all image transmitted to the television monitor.

34. A method as defined in claim 30, wherein said television camera includes a gating circuit for periodical connecting and disconnecting the television monitor from the video signal generated by the television camera, and further including the steps of periodically varying the brightness of the electric arc to a point of minimum brightness by varying the current conducted to the weld head, and connecting the television monitor to the television camera only when the brightness of the electric arc is at said minimum.

35. A method as defined in claim 34, wherein the brightness of the electric arc is minimized between 10 and 100 times per second.

* * * * *